Aug. 27, 1935.  S. B. VAN DALSEM  2,012,488
SPLINT
Filed April 8, 1933

INVENTOR
Stanley B. Van Dalsem

John A. Naismith
ATTORNEY

Patented Aug. 27, 1935

2,012,488

UNITED STATES PATENT OFFICE 2,012,488

SPLINT

Stanley B. Van Dalsem, San Jose, Calif.

Application April 8, 1933, Serial No. 665,100

1 Claim. (Cl. 128—88)

When a limb, such as the human arm, is so badly injured that it must be bound and supported in a fixed position for some considerable length of time, that is, with the fore arm in a rigidly fixed position relative to the upper arm, the muscles and structures entering into the formation of the joint become so set and fixed as to become almost useless when the support is removed, and a prolonged period of more or less painful treatment is required to recondition them.

It is one object of the present invention to provide a splint that may be readily and rigidly applied to a limb in the usual manner, and that will at the same time permit any desired adjustment or movement of one portion of the limb relative to the other without the removal of the splint, or rigidly support the parts in any desired relative position.

It is another object of the invention to provide a device of the character indicated that may be readily adjusted to meet the varying degrees of outward angle of the forearm on the arm at the elbow joint, known as the "carrying angle", when the forearm is in the extended position.

It is also an object of the invention to provide a device of the character indicated that will be economical to manufacture, simple in form and construction, of few parts, light in weight, strong, durable, and highly efficient in its practical application.

Figure 1:
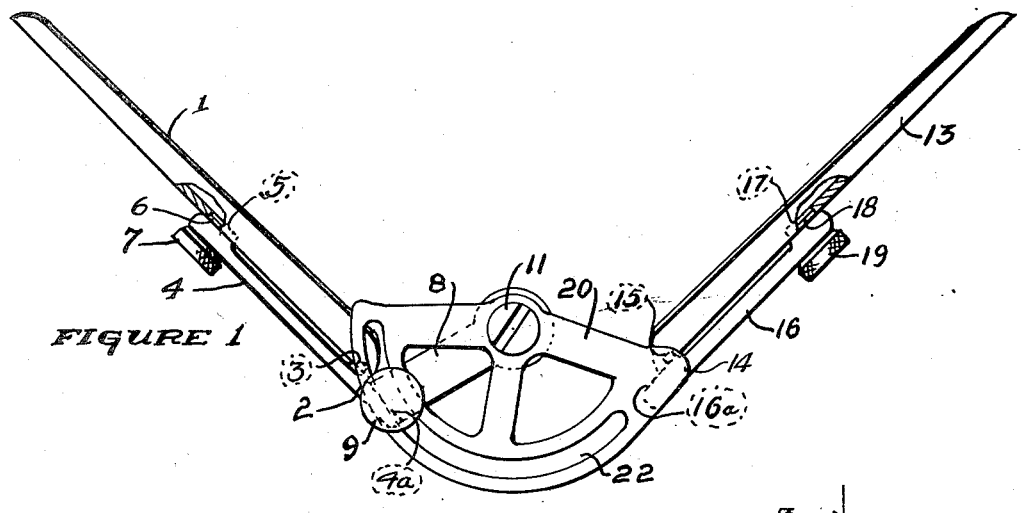
Figure 1 is a side elevation of a device embodying my invention.
Figure 2:
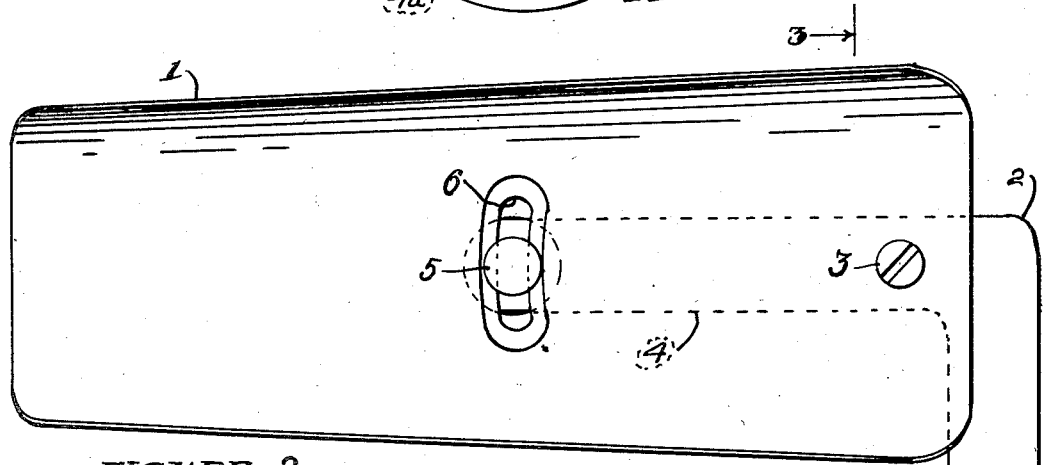
Figure 2 is a full size plan view of one of the elements forming a part of the invention, partly in section and part broken away.
Figure 3:
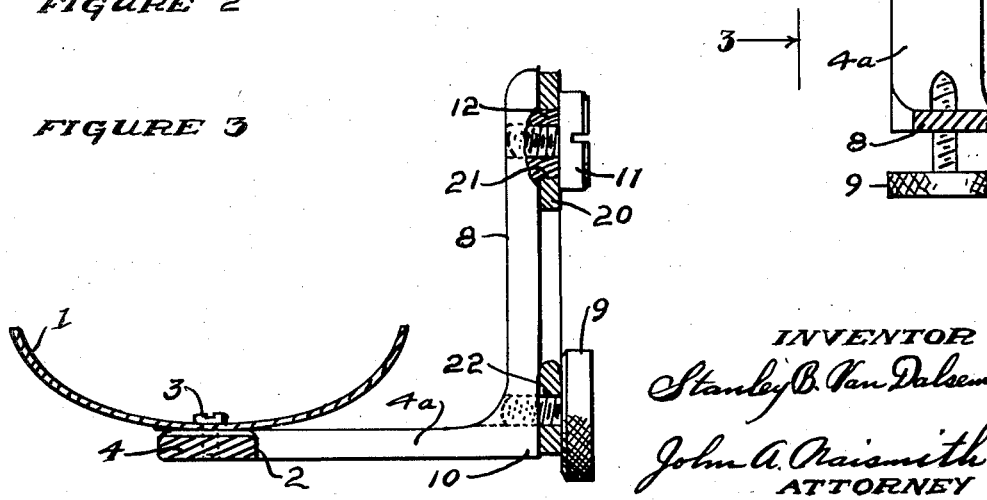
Figure 3 is a view on line 3—3 of Figure 2.

In the embodiment of the invention as herein disclosed I show at 1 a curved plate formed to seat against the member to be supported, the pads, wrappings etc. associated with its practical use not being shown.

At 2 is a bell-crank shaped arm near the elbow of which is disposed a pivot pin 3 which engages plate 1 near one end as shown. The arm 4 of the member 2 underlies the plate 1 and a bolt 5 passes through the arm and an arcuate slot 6 in plate 1. The head of the bolt is seated upon the inside of the plate and a knurled nut 7 is fitted to the outer end of the bolt so that it may be readily loosened and the plate 1 adjusted as desired with respect to arm 4. The arm 8 of member 2 is disposed at right angles thereto and on the side of carrying plate 1 and is fitted with a thumb-screw 9 near elbow 10 and a screw 11 adjacent its free end.

A boss 12 is formed on the arm 8 in such a position and of such dimensions that when the screw 11 is tightened it will seat snugly on the boss and not bind the element pivoted on the boss and hereinafter described.

At 13 is shown a second plate similar to plate 1, and at 14 a bell-crank shaped member provided with a pivot pin 15 at its elbow upon which is pivoted plate 13. The arm 16 of member 14 underlies plate 13 and a bolt 17 passes through the arm and an arcuate slot 18 in the plate. The head of the bolt is seated upon the inside of the plate and a knurled nut 19 is fitted to the outer end of the bolt so that it may be readily loosened and the plate 13 adjusted as desired with respect to arm 16. The arm 16a of member 14 is disposed at right angles thereto and carries the plate 20 hereinafter described.

On the outer end of arm 16a is formed a plate 20 lying in a plane at right angles thereto and having a bearing 21 formed therein to engage the boss 12. In this plate is also formed an arcuate slot 22 so disposed as to receive the thumb-screw 9 by means of which the plate may be rigidly secured in any desired position relative to arm 8.

The arms 4a and 16a extend laterally far enough to permit the parts 8 and 20 to clear the side of the limb and all of its coverings, so that the boss 12 may be disposed substantially in axial alignment with the hinge in the limb being treated.

In order to secure the most satisfactory results it is necessary that the plates 1 and 13 be disposed in parallel relation to those portions of the limb against which they are placed, and the adjustment at 3—5 and 15—17 enables the plates to be accurately accommodated to any degree of carrying angle.

When the splint parts are operatively mounted upon the limb sections they become unitary parts thereof and are immovable with respect thereto, but since the axis of the pivot about which the plates are adjusted is aligned with the axis about which the limb parts move it follows that the parts may be moved into any desired relative position without in the least disturbing the plates in their respective positions on the arm. By loosening the thumb-screw 9 the parts may be manipulated as desired to prevent ankylosis and to promote, insofar as is possible, a more rapid restoration of function of the elbow joint.

It is to be understood, of course, that while I have herein shown and described but one specific embodiment of the invention, changes in form, construction, and method of assembly and operation may be made within the scope of the appended claim.

I claim:

A splint comprising two members, each formed as a single rigid unit and comprising a bell crank and a part disposed at right angles to one of the bell crank arms and at the end thereof to lie in a plane parallel with the other bell crank arm, the two last named parts of the members being pivotally connected in axial alignment with the axis of the joint of the limb upon which the splint is to be mounted whereby the second mentioned arms may be rotated in the same plane at right angles to said axis, an adjustable clamping means connecting said parts, each bell crank having a splint plate pivotally mounted thereon at its elbow, and each plate having an arcuate slot formed therein intermediate its ends with its center of curvature at the pivotal connection of the splint plate to the bell crank arm, and plate clamping means mounted on the second mentioned bell crank arm and engaging said slot.

STANLEY B. VAN DALSEM.